(12) United States Patent
Mouri et al.

(10) Patent No.: US 8,270,269 B2
(45) Date of Patent: Sep. 18, 2012

(54) TIMING EXTRACTION DEVICE AND VIDEO DISPLAY DEVICE

(75) Inventors: Hiroki Mouri, Osaka (JP); Akira Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1377 days.

(21) Appl. No.: 11/918,236

(22) PCT Filed: Nov. 11, 2005

(86) PCT No.: PCT/JP2005/020723
§ 371 (c)(1),
(2), (4) Date: Oct. 11, 2007

(87) PCT Pub. No.: WO2007/007421
PCT Pub. Date: Jan. 18, 2007

(65) Prior Publication Data
US 2009/0060451 A1   Mar. 5, 2009

(30) Foreign Application Priority Data

Jul. 7, 2005   (JP) .................................. 2005-199096

(51) Int. Cl.
*G11B 5/09* (2006.01)
(52) U.S. Cl. ............... 369/47.48; 386/201; 386/248; 386/263; 348/194; 348/537; 369/47.28; 369/47.35; 369/59.19; 369/59.21; 369/124.14
(58) Field of Classification Search ......... 386/201–208, 386/248, 263; 348/194, 537, 572; 369/47.28, 369/47.35, 47.48, 59.19, 59.21, 124.05, 124.14
See application file for complete search history.

(56) References Cited

U.S. PATENT DOCUMENTS

| 5,636,192 A | 6/1997 | Shimizume et al. |
| 6,421,309 B1 | 7/2002 | Kanai et al. |
| 6,792,063 B1 | 9/2004 | Ogura |
| 2002/0021519 A1* | 2/2002 | Rae ................................. 360/51 |
| 2002/0159350 A1* | 10/2002 | Ogura et al. ............... 369/47.35 |
| 2004/0066723 A1 | 4/2004 | Hou et al. |

FOREIGN PATENT DOCUMENTS

| JP | 8-180596 | 7/1996 |
| JP | 8-203206 | 8/1996 |
| JP | 9-120648 | 5/1997 |
| JP | 10-069727 | 3/1998 |
| JP | 2000-090439 | 3/2000 |
| JP | 2002-008315 | 1/2002 |
| JP | 2004-127474 | 4/2004 |
| WO | WO 00/36602 | 6/2000 |

* cited by examiner

*Primary Examiner* — Thai Tran
*Assistant Examiner* — Mishawn Dunn
(74) *Attorney, Agent, or Firm* — McDermott Will & Emery LLP (57) ABSTRACT

An asynchronous timing detector 3 detects and measures a specific pattern (sync pattern) of audio and video reproduced signals having a digital value form an A/D converter 2 and its appearance interval based on an asynchronous clock generated by an asynchronous clock generator 4, and calculates a cycle ratio of the measured sync pattern appearance interval (the number of clock pulses of the asynchronous clock) to a normal value (the number of clock pulses of a synchronous clock obtained by measuring a sync pattern appearance interval using the synchronous clock). A pseudo-synchronous clock generator 7 thins the asynchronous clock based on the cycle ratio to generate a pseudo-synchronous clock which is pseudo-synchronous with channel data. Therefore, even when an initial frequency error is large, frequency and phase pull-in is relatively quickly performed until a timing recovery operation becomes stable.

22 Claims, 12 Drawing Sheets

$NC_0 = N_0 - perr_0$ $NC_1 = NC_0 - perr_1$ $NC_2 = NC_1 - perr_2$

TIMING EXTRACTION DEVICE AND VIDEO DISPLAY DEVICE

RELATED APPLICATIONS

This application is the U.S. National Phase under 35 U.S.C. §371 of International Application No. PCT/JP2005/020723, filed on Nov. 11, 2005, which in turn claims the benefit of Japanese Application No. 2005-199096, filed on Jul. 7, 2005, the disclosures of which Applications are incorporated by reference herein.

TECHNICAL FIELD

The present invention relates to a timing extraction device for extracting timing information included in a signal read out from a recording medium, such as an optical disc or the like.

BACKGROUND ART

In general, memory devices and communication devices include a signal processing device, and in the signal processing device, PRML read channel technology for extracting data information and its data recording timing information from a signal read out from, for example, an optical disc or the like, is commonly used. The PRML read channel technology relates to semiconductor devices in which analog circuitry and digital circuitry coexist, and has difficulty in correctly extracting timing information since the operating frequency of a digital circuit is increased year after year.

Conventionally, when timing information is extracted from an analog signal read out from a recording medium, a VCO (voltage control oscillator) is used to control a frequency and a phase, and a D/A converter (DAC) which is an analog circuit is used for a frequency and phase control signal (Patent Document 1). In Patent Document 2, the process performed by the analog circuit is replaced with a process performed by a digital circuit.

Patent Document 1: Japanese Unexamined Patent Application Publication No. 2002-8315
Patent Document 2: Japanese Unexamined Patent Application Publication No. H10-69727

DISCLOSURE OF THE INVENTION

Problems to be Solved by the Invention

However, in the conventional technique described in Patent Document 1, a control system employs a large number of analog circuits (a D/A converter, etc.), and therefore, even though the digital circuitry could be manufactured into a small size with high accuracy by a miniaturization semiconductor process, such a large number of analog circuits cannot be produced into a small size with high accuracy. As a result, in the analog circuits, there are large variations in resistance values and capacitance values, so that it is difficult to produce a timing extraction device having a small area with high accuracy.

Figure 17:
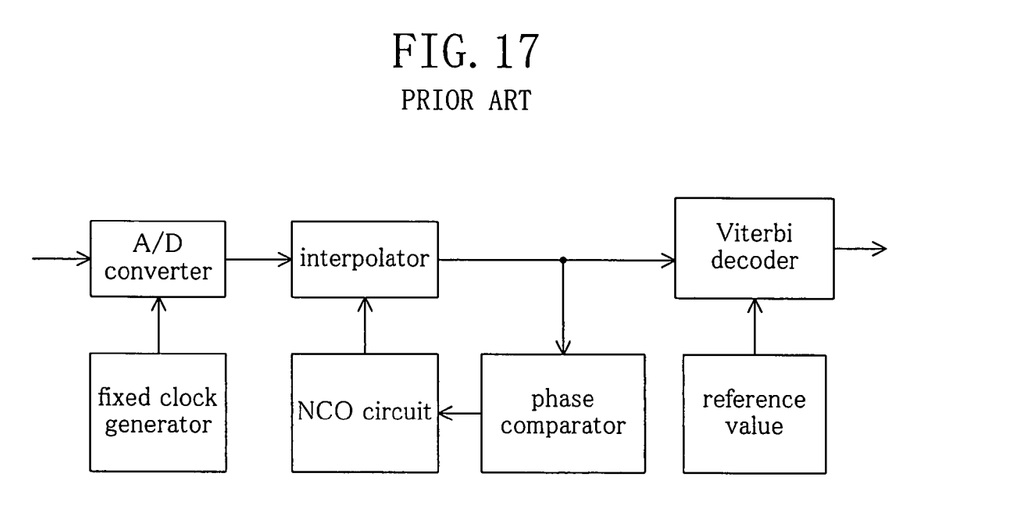
FIG. 17 is a diagram showing a whole configuration of a conventional timing extraction device.

In the conventional technique described in Patent Document 2, the frequency and phase control is performed by a digital circuit, thereby making it possible to reduce the area and achieve the miniaturization of a semiconductor process. However, as illustrated in FIG. 17, during timing recovery, the output of an A/D converter is interpolated in a time-axis direction using an interpolator and a digital signal is converted into data which is synchronous with a channel clock. Therefore, an interpolation error occurs, disadvantageously leading to a deterioration in performance.

In addition, in the conventional techniques described in Patent Documents 1 and 2, since the timing extracting operation uses a feedback loop, it disadvantageously takes a long time for a timing recovery operation to become stable when there is a large error in initial frequency. Specifically, for example, in a product in which a timing extraction device can perform a broad-band process ranging from the CD single speed (4.321 MHz) to the DVD 16× speed (432 MHz) of optical discs, when the speed is suddenly changed, pickup laser located at the outermost periphery is suddenly moved toward the innermost periphery, or the like, a frequency is caused to sharply change. However, synchronization with the channel clock cannot be quickly attained, and it takes a long time for the timing recovery operation to become stable.

In view of the disadvantages described above, an object of the present invention is to perform frequency and phase pull-in relatively quickly until a timing recovery operation becomes stable even when an initial frequency error is large, using a small number of analog circuits which allows a reduction in area and a miniaturization of a semiconductor process.

Solution to the Problems

To achieve the above-described object, in the present invention, timing information existing in a received signal is efficiently extracted using a feedforward technique.

The present invention provides a timing extraction device in an information reproduction device for extracting data and recording timing of the data from a received signal, comprising an asynchronous clock generator for generating an asynchronous clock which is asynchronous with data recording timing of the received signal, an A/D converter for converting the received signal which is an analog signal into a digital signal based on the asynchronous clock of the asynchronous clock generator, an asynchronous timing detector for measuring an appearance interval of a specific pattern included in the digital signal from the A/D converter based on the asynchronous clock of the asynchronous clock generator, and outputting the measured value which is the number of clock pulses of the asynchronous clock, a phase controller for receiving the digital signal from the A/D converter and calculating a phase error between the digital signal and the asynchronous clock generated by the asynchronous clock generator, and a pseudo-synchronous clock generator for thinning the asynchronous clock of the asynchronous clock generator based on the specific pattern appearance interval measured by the asynchronous timing detector and the phase error calculated by the phase controller to generate a pseudo-synchronous clock which is pseudo-synchronous with the data recording timing.

In the timing extraction device of the present invention, the asynchronous timing detector calculates a cycle ratio of the asynchronous clock to the synchronous clock based on the number of clock pulses of the asynchronous clock corresponding to the measured specific pattern appearance interval and a set number of clock pulses of a synchronous clock synchronous with data recording timing within the specific pattern appearance time interval. The pseudo-synchronous clock generator thins the asynchronous clock of the asynchronous clock generator based on the cycle ratio from the asynchronous timing detector and the phase error calculated by the phase controller.

In the timing extraction device of the present invention, the asynchronous timing detector receives the digital signal and determines that a specific pattern has been detected if a ratio of the number of successive data "1"s to the number of successive data "0"s included in the digital signal is within a predetermined range.

In the timing extraction device of the present invention, the asynchronous timing detector determines that a specific pattern has been detected only if a ratio of the number of successive data "1"s to the number of successive data "0"s is within a predetermined range and a total of the number of the successive "1"s and the number of the successive "0"s is within a predetermined range.

The timing extraction device of the present invention comprises a synchronous timing detector for receiving the pseudo-synchronous clock generated by the pseudo-synchronous clock generator, and based on the pseudo-synchronous clock, measuring an appearance interval of a specific pattern included in the digital signal from the A/D converter, and confirming whether or not the number of clock pulses of the pseudo-synchronous clock corresponding to the measured specific pattern appearance interval is equal to a set number of clock pulses of a synchronous clock synchronous with data recording timing within the specific pattern appearance time interval.

In the timing extraction device of the present invention, the asynchronous clock generator generates an asynchronous clock having a fixed frequency.

In the timing extraction device of the present invention, a ratio of the number of successive data "1"s and the number of successive data "0"s included in the digital signal is 14:4 in DVD-ROMs, 11:11 in CDs, and 2:9:9 in Blu-rays.

In the timing extraction device of the present invention, the predetermined range is a range of a ratio in which there is a margin of ±1 with respect to each of the number of successive data "1"s and the number of successive data "0"s.

In the timing extraction device of the present invention, the set number of clock pulses of the synchronous clock within the specific pattern appearance time interval is 1488 in DVDs, 588 in CDs, and 1932 in Blu-rays.

In the timing extraction device of the present invention, the phase controller includes a loop filter for smoothing a calculated phase error value.

In the timing extraction device of the present invention, the loop filter includes an FIR digital filter.

In the timing extraction device of the present invention, the loop filter includes an FIR digital filter.

In the timing extraction device of the present invention, the loop filter calculates an average value of calculated phase errors in predetermined time intervals.

In the timing extraction device of the present invention, the loop filter subjects a calculated phase error to gain multiplication with a specific value.

In the timing extraction device of the present invention, a baseline controller for removing a DC offset included in the digital signal from the A/D converter is provided between the A/D converter and the asynchronous timing detector.

In the timing extraction device of the present invention, a digital equalizer for amplifying a signal having a specific band of the digital signal from the A/D converter is provided between the A/D converter and the asynchronous timing detector.

In the timing extraction device of the present invention, the asynchronous timing detector has a zero crossing detector operated based on the asynchronous clock of the asynchronous clock generator and for determining the polarities of two adjacent pieces of data in the digital signal from the A/D converter.

In the timing extraction device of the present invention, the asynchronous timing detector has an adder for receiving the asynchronous clock of the asynchronous clock generator, and based on the asynchronous clock, adding the number of clock pulses of the asynchronous clock.

In the timing extraction device of the present invention, the phase controller has an adder and a multiplier for receiving the digital signal from the A/D converter, and based on the asynchronous clock of the asynchronous clock generator, calculating a phase error in the digital signal from the A/D converter.

A video display device of the present invention comprises an LSI having the timing extraction device and a signal processing circuit for receiving the pseudo-synchronous clock obtained by the timing extraction device, and based on the pseudo-synchronous clock, decoding a received signal including audio data and video data, and a display terminal for receiving a decoded signal from the LSI and displaying decoded video data while emitting decoded audio data.

In the timing extraction device of the present invention, the received signal is supplied via a wireless communication channel or a communication channel including an optical fiber, a coaxial cable, or a power line.

In the timing extraction device of the present invention, the received signal is supplied from an optical disc including a DVD disc, a CD disc, or a Blu-ray disc.

As described above, in the present invention, the asynchronous timing detector detects and measures a specific pattern (e.g., a sync pattern) included in a data reproduced signal having a digital value, and an appearance interval thereof, based on the asynchronous clock of the asynchronous clock generator. Thereafter, the pseudo-synchronous clock generator thins the asynchronous clock of the asynchronous clock generator based on the measured specific pattern appearance interval corresponding to the number of clock pulses of the asynchronous clock and the phase error calculated by the phase controller, to generate a pseudo-synchronous clock which is a synchronous clock pseudo-synchronous with channel data. Thus, the pseudo-synchronous clock pseudo-synchronous with the data recording timing is generated using the feedforward technique, so that a time required for a timing recovery operation to become stable can be caused to be relatively short, thereby making it possible to quickly pull in the frequency and the phase.

Effect of the Invention

As described above, according to the timing extraction device of the present invention, it is possible to quickly pull in the frequency and the phase using the feedforward technique, and also invariably quickly pull in the frequency and the phase without depending on an initial frequency error.

DESCRIPTION OF THE REFERENCE CHARACTERS

| | |
|---|---|
| 1 | recording medium |
| 2 | A/D converter |
| 3 | asynchronous timing detector |
| 3a | zero crossing detector |
| 3b | first sync pattern detector |
| 3c | first sync pattern interval counter |
| 3d | divider |
| 4 | asynchronous clock generator |
| 5 | synchronous timing generator |
| 5a | second sync pattern detector |
| 5b | second sync pattern interval counter |
| 5c | comparator |
| 6 | phase controller |
| 6a | phase comparator |
| 6b | loop filter |
| 7 | pseudo-synchronous clock generator |
| 7a | NC word controller |
| 7b | NCO circuit |
| 10 | baseline controller |
| 11 | digital equalizer |
| 15 | LSI |
| 16 | display terminal |

BEST MODE FOR CARRYING OUT THE INVENTION

Hereinafter, timing extraction devices according to embodiments of the present invention will be described with reference to the accompanying drawings.

Embodiment 1

Figure 1:
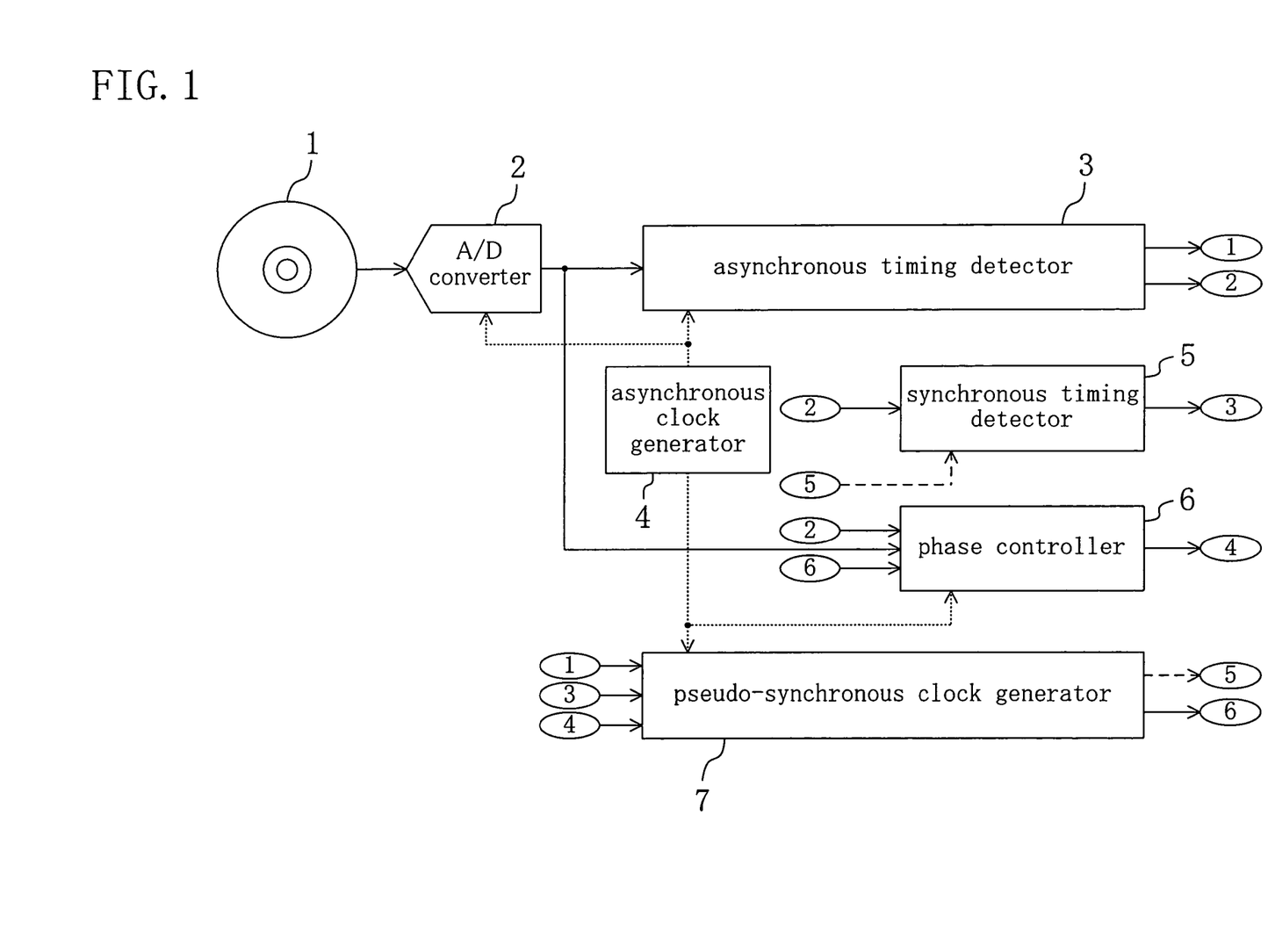
FIG. 1 is a diagram showing a whole configuration of a timing extraction device according to an embodiment of the present invention.

FIG. 1 shows an embodiment of the timing extraction device of the present invention.

The timing extraction device of this embodiment is a timing extraction device in an information reproduction device which extracts data and its data recording timing from an analog reproduced signal (received signal) including data information and its data recording timing information which are recorded in a recording medium 1, such as an optical disc or the like.

The timing extraction device of FIG. 1 is operated with two kinds of clocks, i.e., a clock having a fixed frequency which is not necessarily synchronous with the data recording timing (hereinafter referred to as an asynchronous clock) and a clock which is pseudo-synchronous with the data recording timing (hereinafter referred to as a pseudo-synchronous clock).

Specifically, as shown in FIG. 1, this timing extraction device comprises an A/D converter 2, an asynchronous timing detector 3, a synthesizer 4 which is an analog circuit for generating an asynchronous clock having a fixed frequency, a synchronous timing detector 5, a phase controller 6, and a pseudo-synchronous clock generator 7 for generating a pseudo-synchronous clock.

Figure 2:
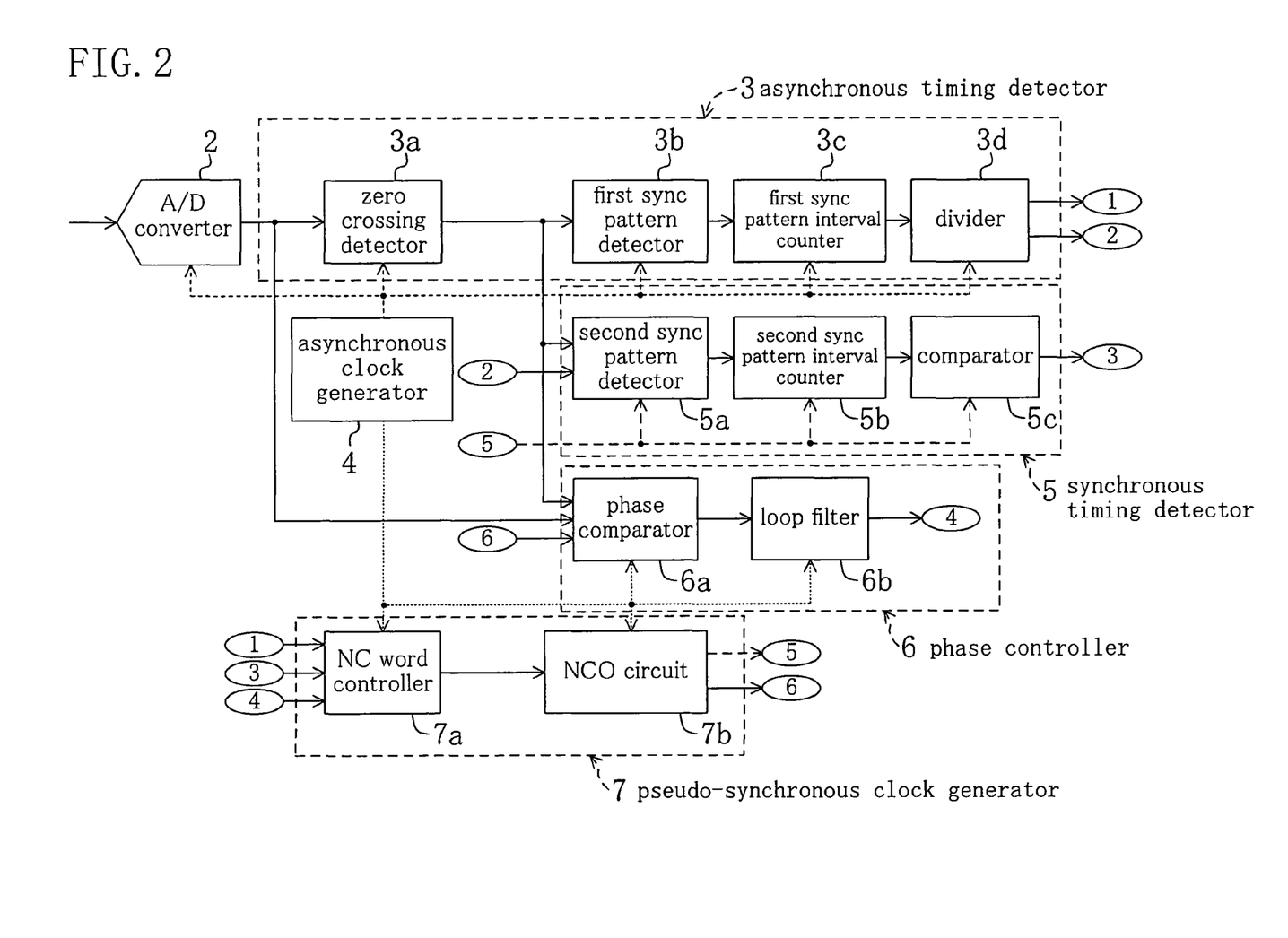
FIG. 2 is showing a detailed configuration of the timing extraction device.

FIG. 2 shows a specific internal configuration of this timing extraction device. The asynchronous timing detector 3 has a zero crossing detector 3a, and a sync pattern detector 3b, a sync pattern interval counter 3c, and a cycle ratio calculator 3d including a divider for obtaining a cycle ratio, which are operated with an asynchronous clock. The synchronous timing detector 5 has a sync pattern detector 5a, a sync pattern interval counter 5b, and a comparator 5c, which are operated with a pseudo-synchronous clock. The phase controller 6 has a phase comparator 6a and a loop filter 6b. The pseudo-synchronous clock generator 7 has an NC word controller 7a and an NCO (Number Control Oscillator) circuit 7b.

The parts described above will be described in more detail while describing their operations. When the recording medium 1 is, for example, an optical disc, such as a DVD or the like, an analog reproduced signal waveform read out from the optical disc 1 is converted from an analog signal to a digital signal by the A/D converter 2, and thereafter, the zero crossing detector 3a determines the polarities of data at two successive points of the resultant digital reproduced signal so as to detect a zero crossing point. Such a process is repeatedly performed. If a zero crossing point is detected, then the sync pattern detector 3b searches for a sync pattern (specific pattern). Hereinafter, the details will be described. Firstly, the data format of the recording medium 1, such as a DVD-ROM, a Blu-ray or the like, will be described.

Figure 3:
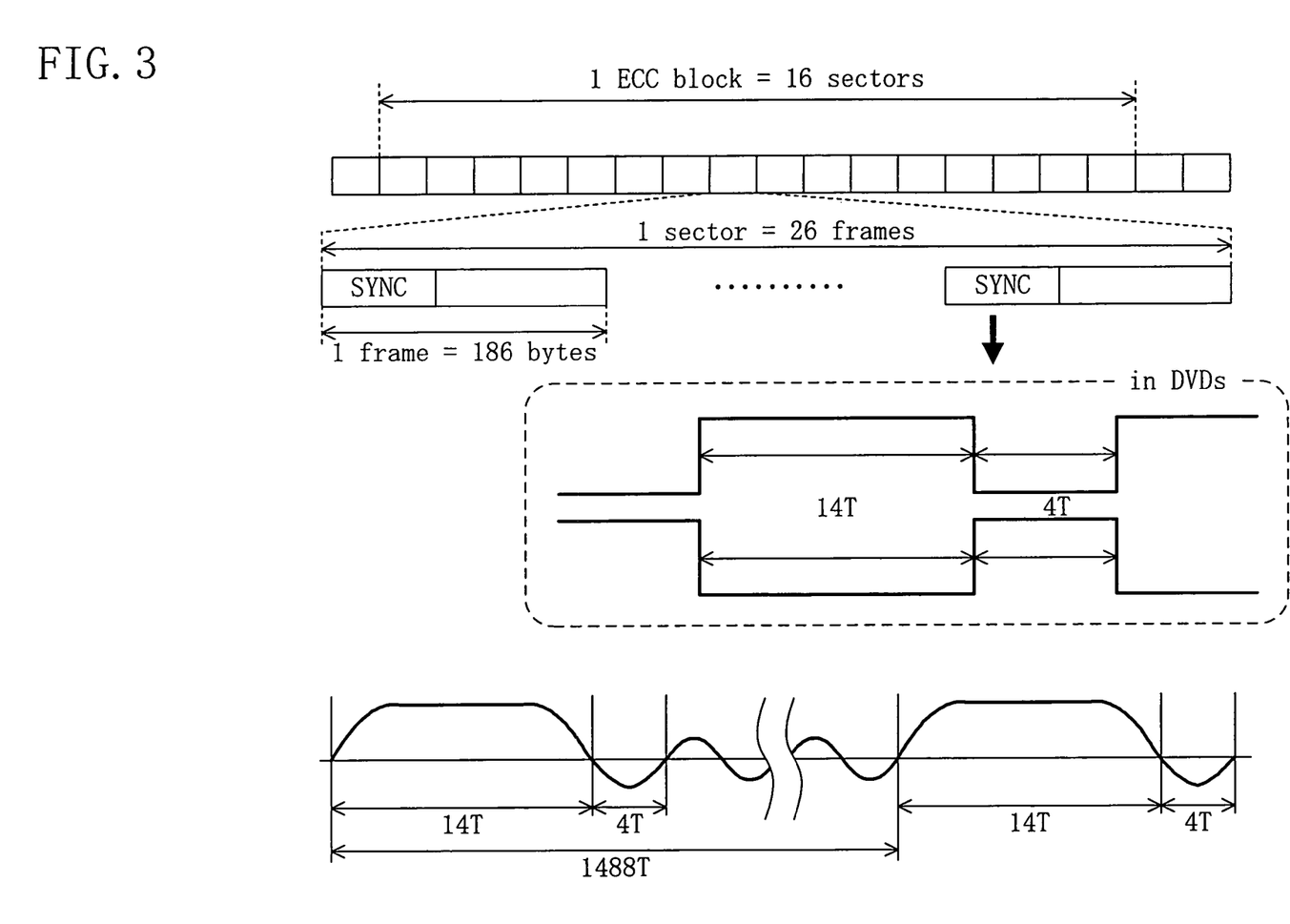
FIG. 3 is a diagram for describing the data format of DVDs.

DVD-ROMs have ECC (Error Correction Coding) blocks including so-called recording frames. As shown in FIG. 3, one ECC block is composed of 16 recording frames. A physical sector is one recording frame which is 8/16 modulated. One sector of one ECC block includes a data pattern composed of 26 frames. One frame is called a sync frame, which is composed of a 32-bit sync pattern and a 1456-bit channel bit (a total of 1488 bits). The sync pattern is a data pattern which does not exist in a user area. The sync pattern is a predetermined specific pattern (characteristic bit pattern) which has, for example, a cycle of 14 T-4 T (T represents a time for which synchronization is attained with respect to a channel) which is "1111111111111110000" or "00000000000001111" in a sync code in DVD-ROMs, a cycle of 11 T-11 T in CDs, and a cycle of 2 T-9 T-9 T in Blu-rays. These sync patterns appear every 1488 T in DVDs, every 588 T in CDs, and every 1932 T in Blu-rays.

Figure 4:
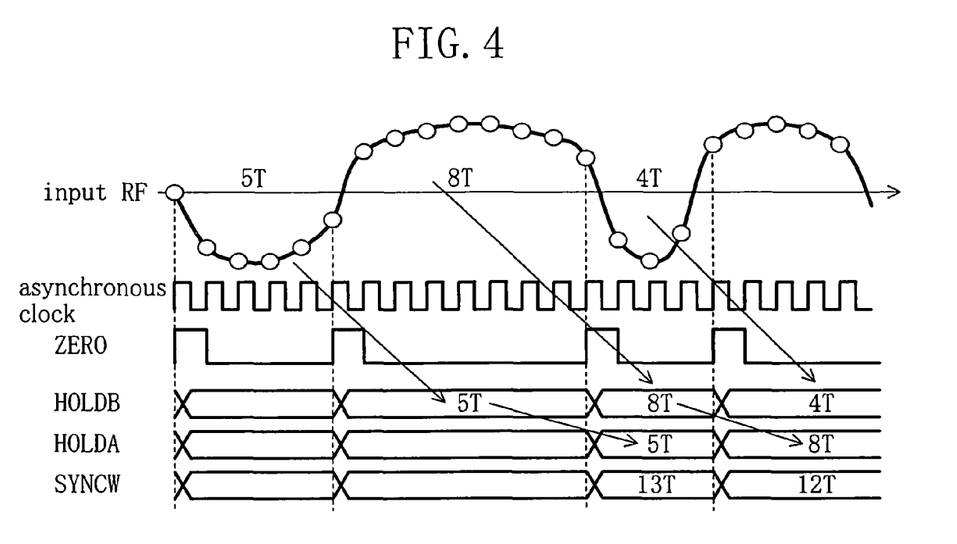
FIG. 4 is a diagram for describing a procedure for zero crossing detection and data counting by the timing extraction device.

Next, detection of the sync pattern by the sync pattern detector 3b will be described. Initially, as shown in FIG. 4, with reference to a zero crossing determination signal ZERO, data of the zero crossing interval (between two rising timing times of the zero crossing determination signal ZERO) is counted using the asynchronous clock of the synthesizer 4. The sync pattern detector 3b includes such a counter (adder), though it is not shown. The counted data is handled as a parameter called an old count value HOLDA or a new count value HOLDB. Eventually, a total value SYNCW (=HOLDB+HOLDA) is obtained and held. It is determined using expression (1) whether or not the ratio of the current value HOLDB to the previous value HOLDA is within a predetermined range including a ratio of 14:4. This expression has a margin of ±1 for the count value.

$$13/5 \leq HOLDB/HOLDA \leq 15/3 \quad (1)$$

Figure 5:
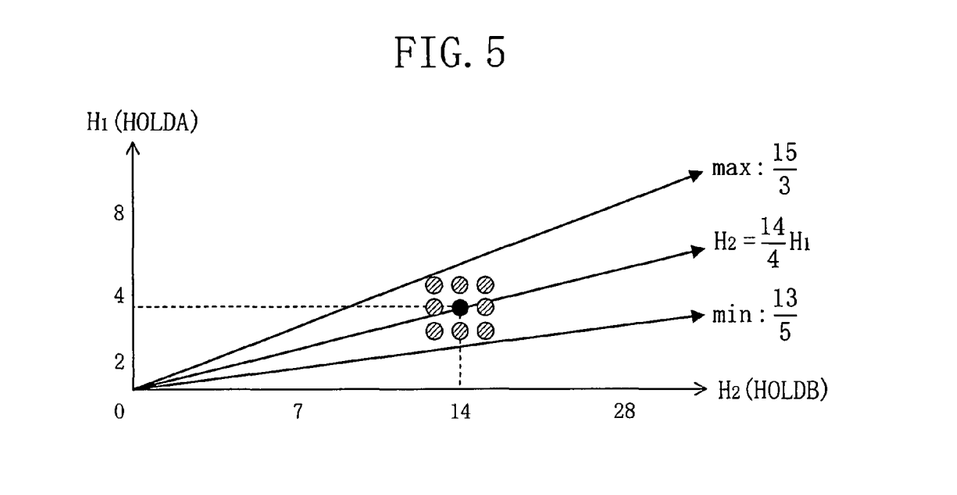
FIG. 5 is a diagram for describing detection of a sync pattern by the timing extraction device.
Figure 6:
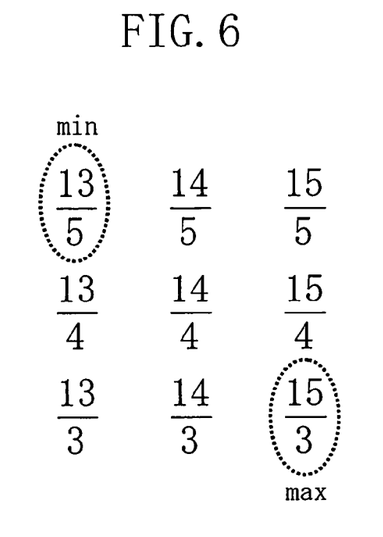
FIG. 6 is a diagram schematically showing the sync pattern detection.

Expression (1) is diagrammatically illustrated in FIGS. 5 and 6.

If the ratio of 14:4 can be detected while expression (1) is satisfied, then a largest value of the sync pattern is considered. The total value SYNCW can be estimated to be a largest pattern sequence within one sync frame. Therefore, in view of a margin of the detected largest value, it is determined whether or not the largest value of the sync pattern is within a predetermined range of conditional expression (2) below.

$$\text{largest pattern length} \times 0.9 \leq SYNCW \leq \text{largest pattern length} \times 1.1 \quad (2)$$

If either or desirably both of conditional expressions (1) and (2) are satisfied, then it is determined that a sync pattern has been detected. When a sync pattern has not been detected, data counting is continued until a sync pattern is detected.

If a sync pattern is detected in this manner, then an interval between two successive sync patterns (i.e., a sync pattern appearance interval) is counted and measured by the sync pattern interval counter 3c. Here, a count value (normal set number) for one sync frame when a sync pattern appearance interval is counted using a synchronous clock which is synchronous with channel data, is 588 in CDs, 1488 in DVDs, and 1932 in Blu-rays, which are normal values, as described above. However, the counting operation of the sync pattern interval counter 3c is performed based on the asynchronous clock (fixed frequency) of the synthesizer 4, and therefore, the number of counts in one sync frame takes various values until the operation of the timing recovery system becomes stable. Therefore, it is necessary to detect a sync pattern and a sync frame based on the count value measured using the asynchronous clock of the synthesizer 4, and pull in the frequency and the phase to lock the PLL. To achieve this, a relationship between the frequency of the asynchronous clock and the frequency of data (i.e., a so-called cycle ratio) is calculated.

The cycle ratio is calculated by the cycle ratio calculator 3d as follows. During an initial operation (i.e., the PLL circuit is not locked), since the cycle ratio is unclear, the cycle ratio is obtained by the following process. Specifically, a ratio A/B of the normal value (set number) A to a count value B within one sync frame counted using the asynchronous clock of the synthesizer 4 is obtained by multiplying the reciprocal of the count value within one sync frame counted by the asynchronous clock by the normal value (1488 in DVDs). For example, when the count value is 2976, the cycle ratio is 1488/2976=0.5. In other words, the synthesizer 4 is operated at a frequency which is two times higher than the channel rate. The frequency of the synthesizer 4 needs to be higher than the channel rate even by a little amount (e.g., 1.01, 1.05 or the like times higher), i.e., oversampling is required.

After the cycle ratio is obtained based on the count value within one sync frame in this manner, the asynchronous clock of the synthesizer 4 is thinned based on the obtained cycle ratio by the pseudo-synchronous clock generator 7 to obtain a pseudo-synchronous clock which is synchronous with channel data. In addition, in view of the phase error value calculated by the phase controller 6, the pseudo-synchronous clock is adjusted so that the phase thereof becomes synchronous with the channel data. This pseudo-synchronous clock is used to operate the sync pattern detector 5a and the sync pattern interval counter 5b of the synchronous timing detector 5 of FIG. 2, thereby confirming whether or not a sync pattern is being correctly detected and one frame of data is being counted. If timing recovery is stable, a sync pattern ratio of 14 T:4 T, a largest pattern length of 18 T, and a sync pattern interval of 1488 are calculated in the case of DVDs. Note that, in the phase controller 6, the phase error value is calculated using adjacent data close to a baseline. Hereinafter, operations of the phase control process and the asynchronous clock thinning process will be specifically described.

Figure 7:
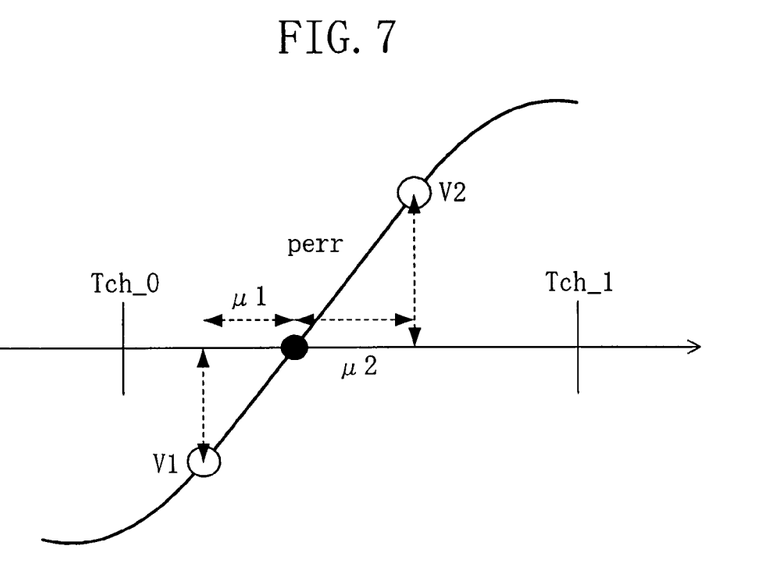
FIG. 7 is a diagram for describing calculation of a phase error by the timing extraction device.

The phase comparator 6a of the phase controller 6 calculates a phase error value using expression (3) below as can be seen from the diagram of FIG. 7 which describes the phase error. To calculate expression (3), the phase controller 6 includes an adder and a multiplier (not shown).

$$(perr - \mu_1) : |V1| = (\mu_2 - perr) : |V2| \quad (3)$$

$$perr = \frac{\mu_2 \times |V1| + \mu_1 \times |V2|}{|V1| + |V2|}$$

$$\because \mu_2 > \mu_1$$

Figure 8:
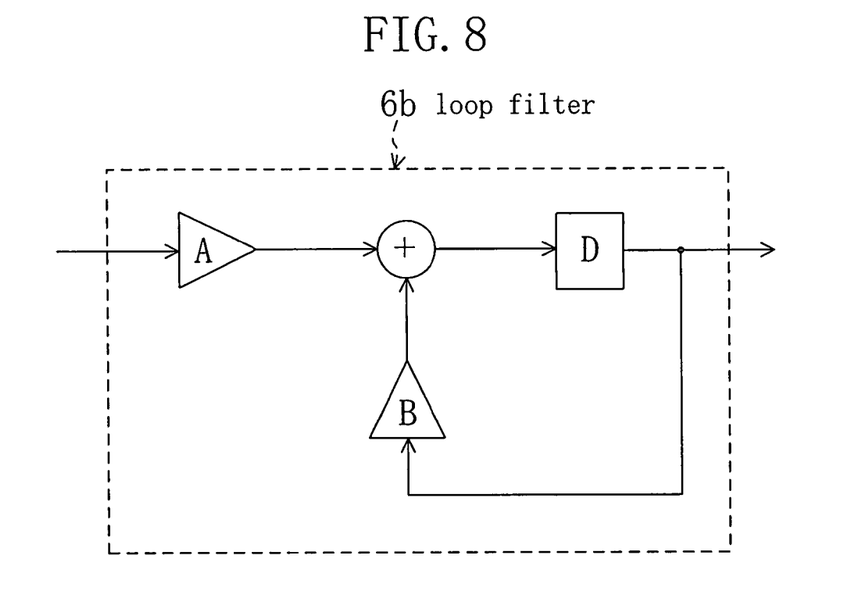
FIG. 8 is a diagram showing an internal configuration of a loop filter in a phase controller of the timing extraction device.
Figure 9:
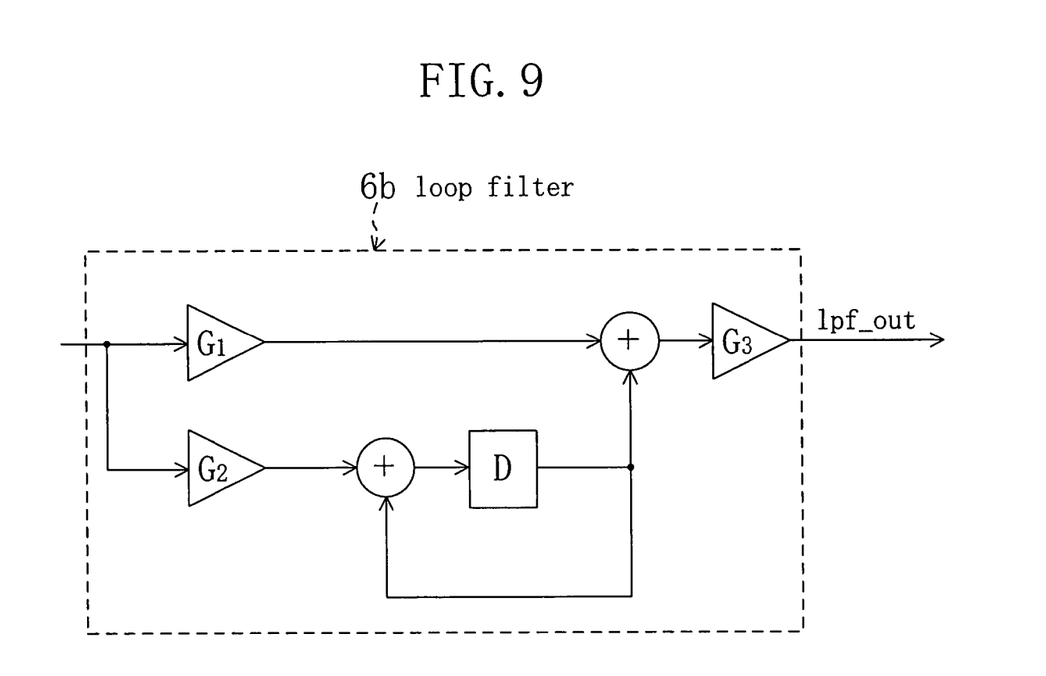
FIG. 9 is a diagram showing another internal configuration of the loop filter.

The loop filter 6b of the phase controller 6 smoothes the phase error value calculated by the phase comparator 6a. The loop filter 6b may be comprised of an I I R filter as shown in, for example, FIG. 8 or may be comprised of an FIR filter which performs gain multiplication using three gains G1, G2 and G3 as shown in FIG. 9. Further, an average value of calculated phase errors may be calculated in predetermined time intervals.

Figure 10:
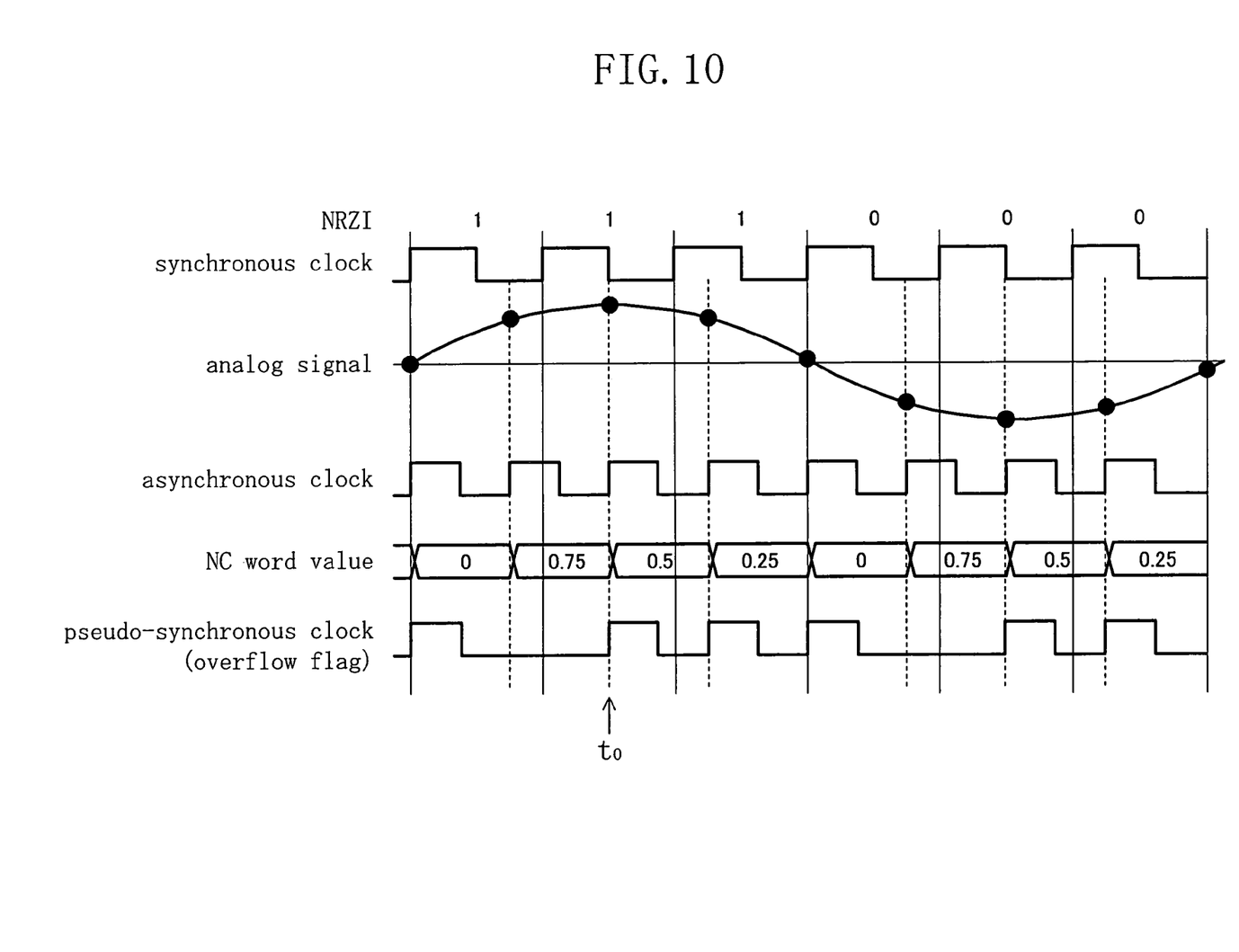
FIG. 10 is a diagram showing generation of an NC word value based on a frequency ratio by a pseudo-synchronous clock generator of the timing extraction device.
Figure 11:
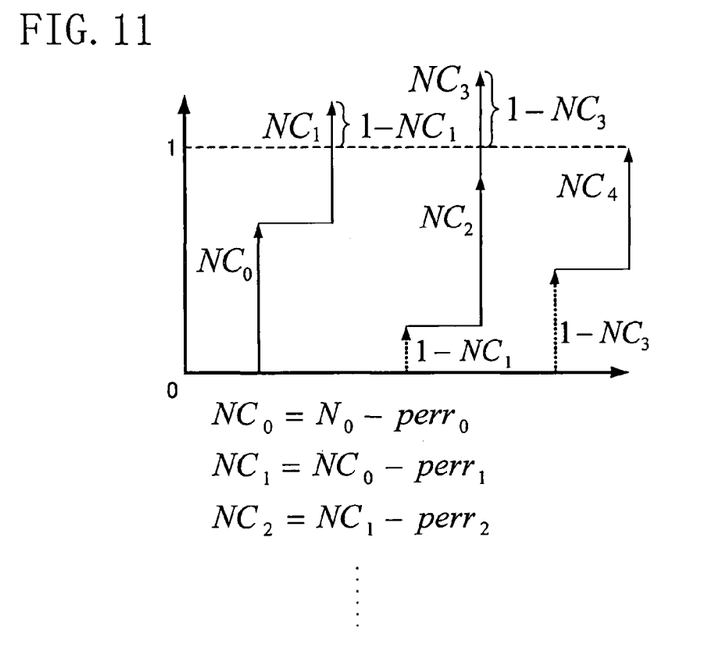
FIG. 11 is a diagram showing generation of an NC word value based on a phase error by the pseudo-synchronous clock generator.

After a phase error is calculated, an NC word controller 7a of the pseudo-synchronous clock generator 7 initially modifies an NC word value for adjusting the count of the pseudo-synchronous clock. To modify the NC word value, for each cycle of the asynchronous clock, the cycle ratio of the cycle ratio calculator 3d is added to the previous NC word value and the phase error perr calculated by the phase controller 6 for each zero crossing point is subtracted from the previous NC word value, and the result of the addition and subtraction is subjected to a mod 1 operation. The mod 1 operation is such that the result of the addition and subtraction is divided by 1, and when the result of the operation exceeds 1, i.e., there is a remainder, the remainder is set as a current NC word value. For example, FIG. 10 shows a case where the cycle ratio=0.75. For example, at timing t0, the cycle ratio=0.75 is added to the previous NC word value (=0.75), and the value to the right of the decimal point (=0.5) of the addition result (=1.5) is set as a current NC word value. Further, as shown in FIG. 11, the current phase error perr calculated by the phase controller 6 is subtracted from the previous NC word value for each zero crossing point to calculate a current NC word value. When there is an operation result which exceeds 1 in the mod 1 operation, the NC word controller 7a outputs a flag called an overflow flag.

In the pseudo-synchronous clock generator 7, after the NC word value is set in the NC word controller 7a, a pseudo-synchronous clock is generated in the NCO circuit 7b. The NCO circuit 7b receives the overflow flag from the NC word controller 7a, and when this overflow flag is received, thins the asynchronous clock to generate a pseudo-synchronous clock as shown in FIG. 10. Thus, phase errors are taken into account over time and the phase is pulled in, so that timing recovery becomes stable. The pseudo-synchronous clock generated by the NCO circuit 7b is supplied to, for example, a Viterbi decoder, and a decoded digital reproduced signal is displayed.

Figure 12:
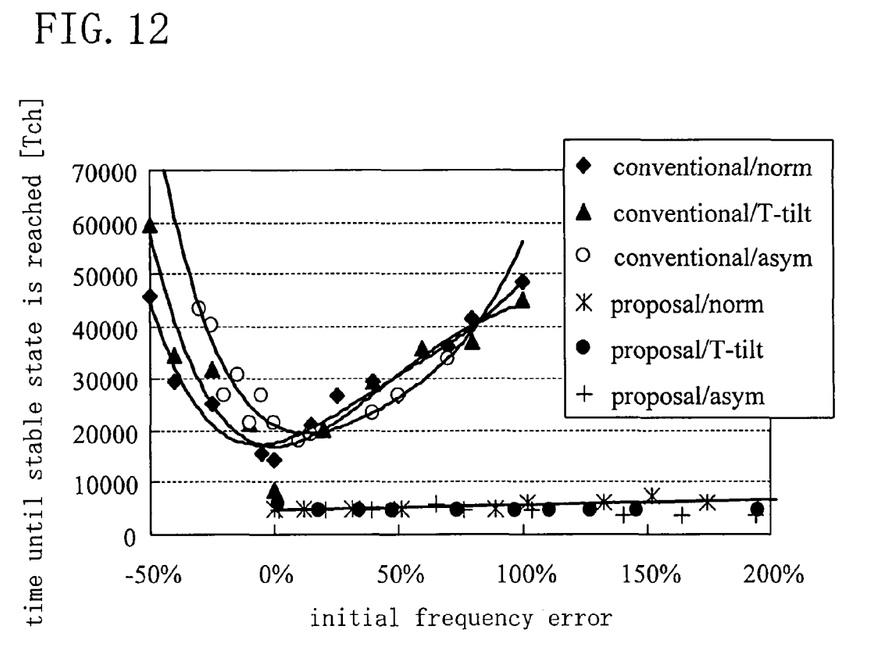
FIG. 12 is a diagram showing frequency pull-in operation characteristics of the timing extraction device.

FIG. 12 shows a relationship between errors in an initial frequency and times required for the frequency to be pulled in. Conventionally, the time required for timing recovery to become stable significantly varies due to a deviation in frequency. By contrast, in this embodiment, timing recovery becomes stable in substantially a constant time without depending on the frequency error. In addition, the time required for timing recovery to become stable is about four times or more as fast as in the conventional art.

Figure 13:
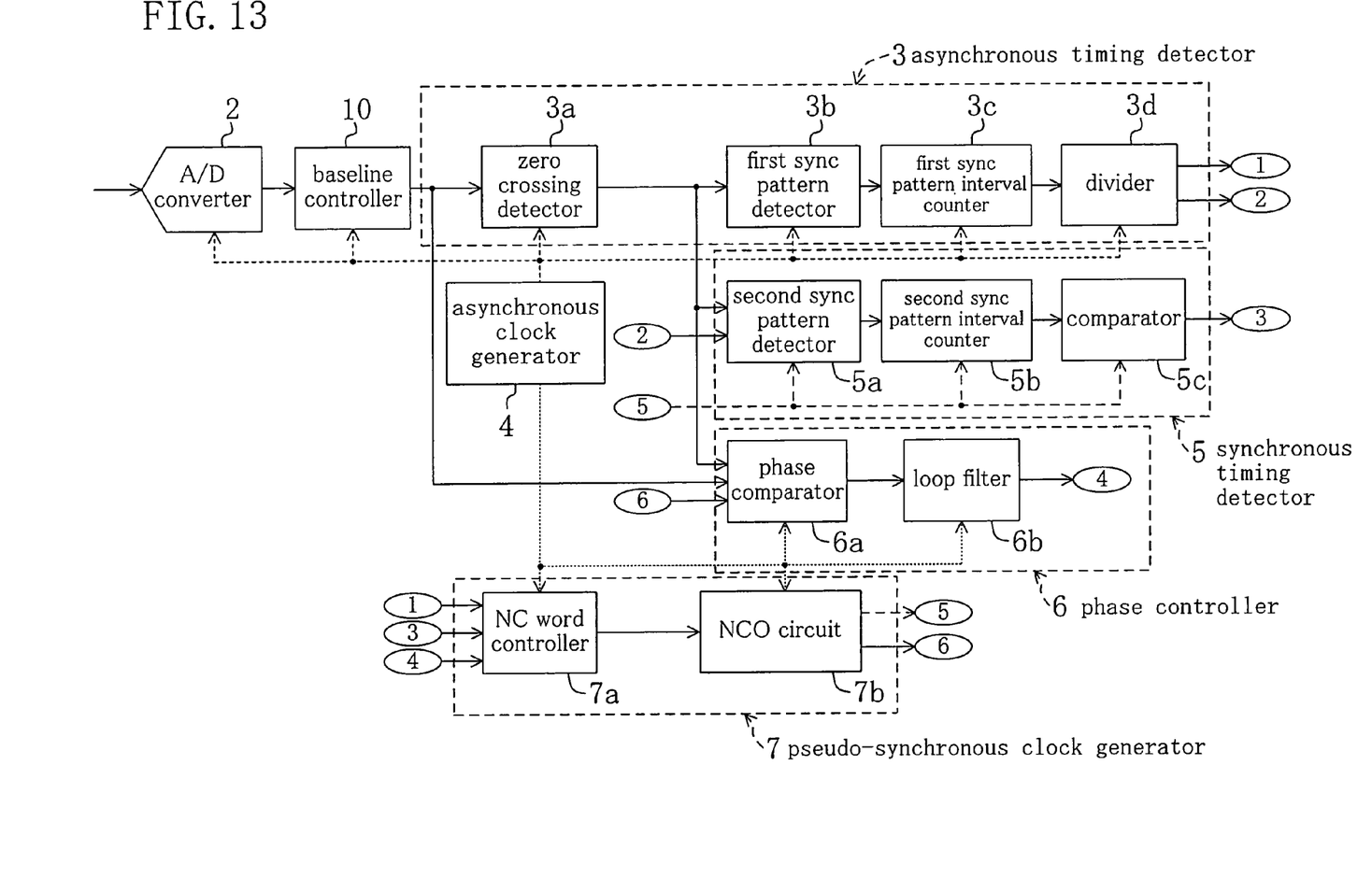
FIG. 13 is a diagram showing a variation of the timing extraction device.
Figure 14:
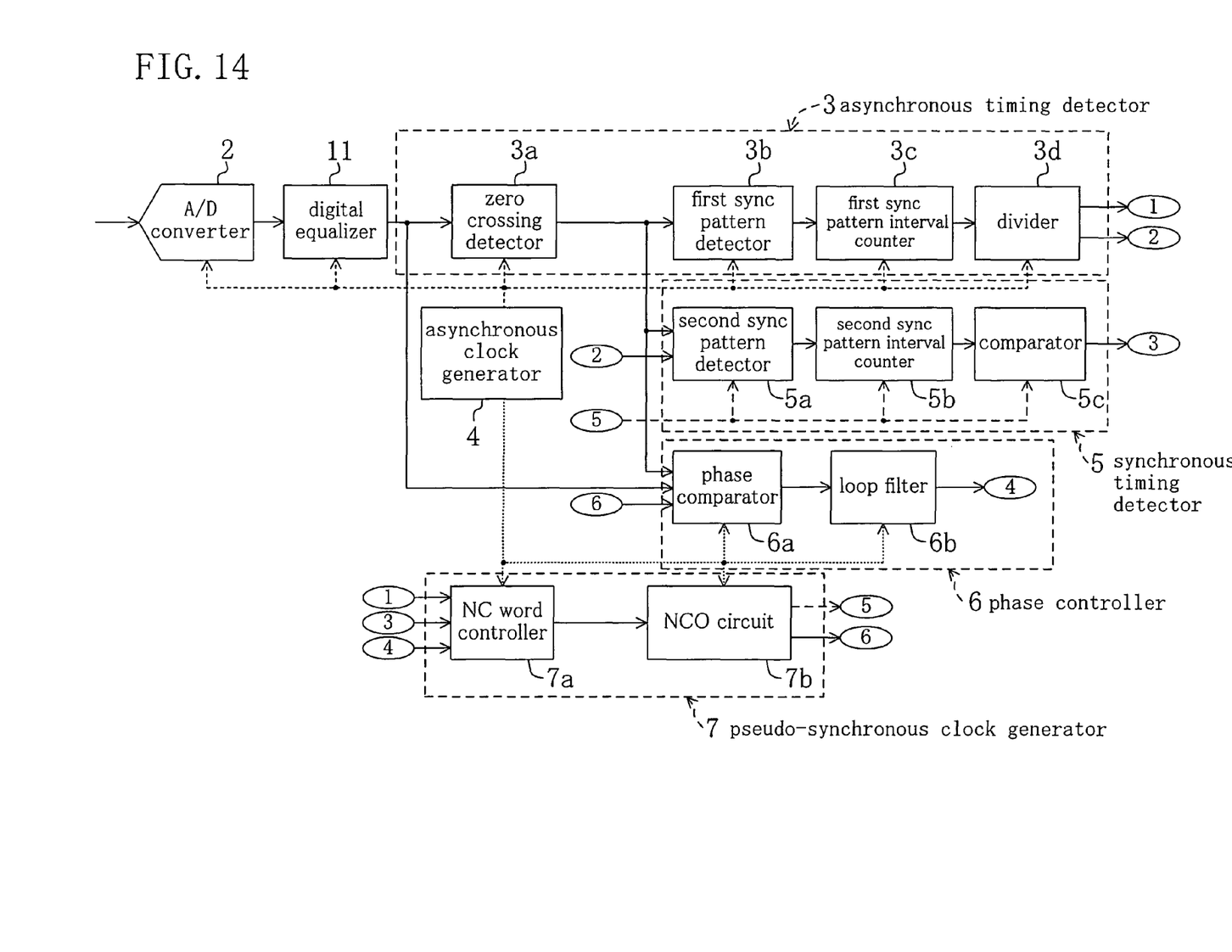
FIG. 14 is a diagram showing another variation of the timing extraction device.
Figure 15:
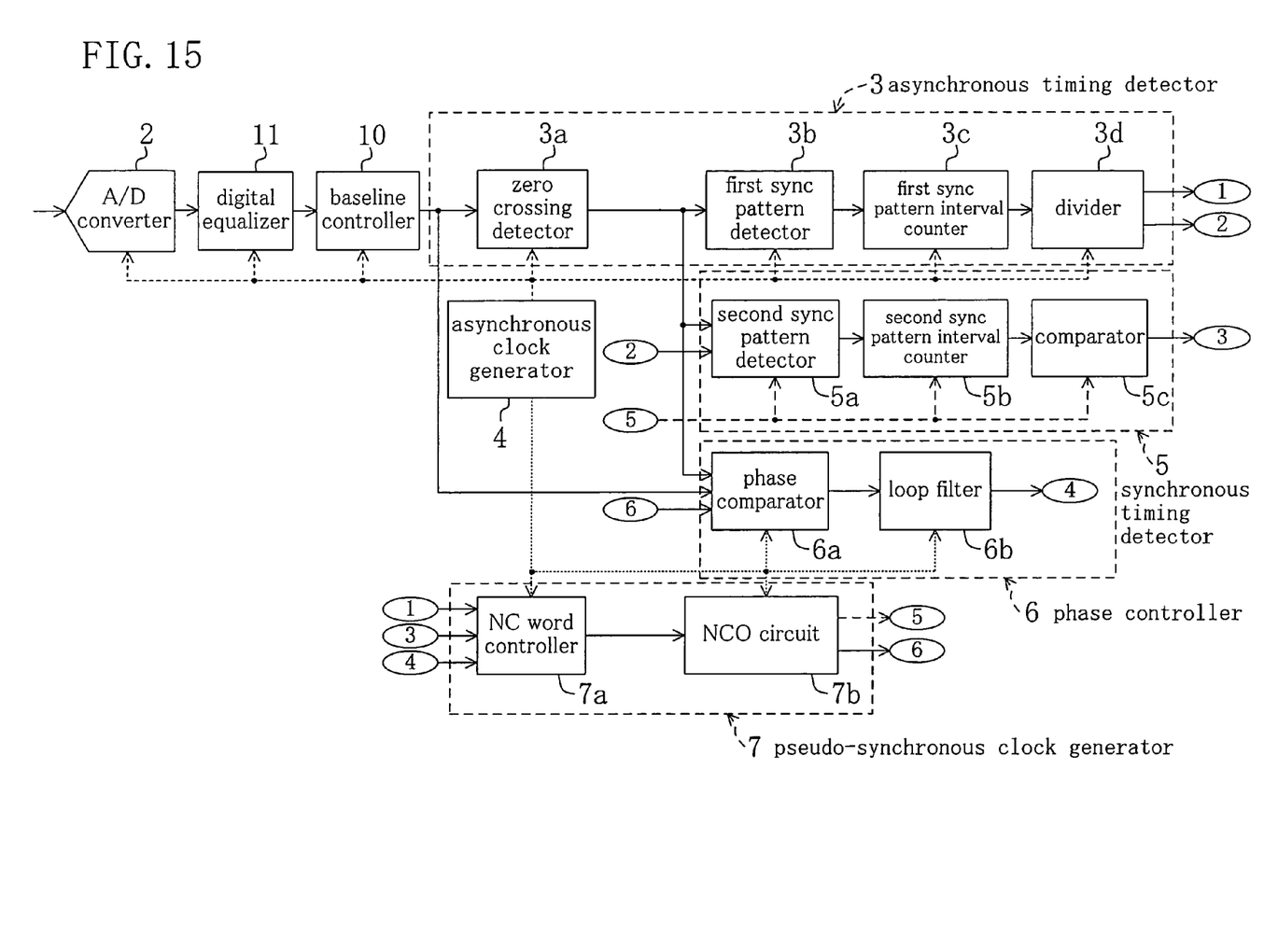
FIG. 15 is a still another variation of the timing extraction device.

FIGS. 13 to 15 show variations of the timing extraction device of the first embodiment. In FIG. 13, in the timing extraction device of FIG. 2, a baseline controller 10 is added between the A/D converter 2 and the asynchronous timing detector 3 so as to remove a DC offset of the digital signal output from the A/D converter 2. In FIG. 14, a digital equalizer 11 is provided between the A/D converter 2 and the asynchronous timing detector 3 so as to amplify only a specific band of the digital signal output from the A/D converter 2. In FIG. 15, FIG. 13 and FIG. 14 are combined, i.e., the digital equalizer 11 and the baseline controller 10 are provided between the A/D converter 2 and the asynchronous timing detector 3, where the digital equalizer 11 is provided before the baseline controller 10.

Figure 16:
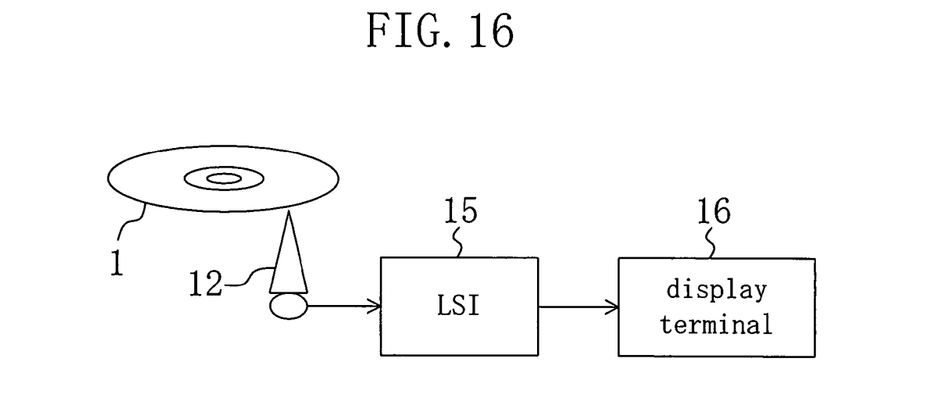
FIG. 16 is a diagram roughly showing a whole configuration of a video display device comprising the timing extraction device.

FIG. 16 shows a video display device comprising an LSI including this timing extraction device. The LSI 15 includes a signal processing circuit for performing waveform equalization, error correction, control, modulation, decoding, data extraction, or the like using a reproduced signal waveform which is read out from the recording medium 1, such as an optical disc or the like, using laser of a pickup 12. Based on a decoded reproduced signal output from the LSI 15, audio data having an analog value or a digital value is emitted while video data is displayed on a display terminal 16.

Although it has been described above that timing information is extracted from an analog reproduced signal from a recording medium, such as an optical disc or the like, the present invention is also applicable when timing information is extracted from a signal supplied via a wireless communication channel or a wired communication channel (an optical fiber, a coaxial cable, a power line, etc.).

Further, the present invention is also applicable when output data of the A/D converter 2 is stored in a memory and the output data is subjected to a series of processes described above by software so that timing information is extracted.

INDUSTRIAL APPLICABILITY

As described above, in the present invention, a feedforward technique can be used to pull in a frequency and a phase quickly, and the frequency and phase pull-in can be quickly achieved without depending on an initial frequency error. Therefore, the present invention is useful as a timing information extraction device in an information reproduction device having digital signal processing technology, such as, for example, a timing extraction device for an optical disc or the like.

The invention claimed is:

1. A timing extraction device in an information reproduction device for extracting data and recording timing of the data from a received signal, comprising:
an asynchronous clock generator for generating an asynchronous clock which is asynchronous with data recording timing of the received signal;
an A/D converter for converting the received signal which is an analog signal into a digital signal based on the asynchronous clock of the asynchronous clock generator;
an asynchronous timing detector for measuring an appearance interval of a specific pattern included in the digital signal from the A/D converter based on the asynchronous clock of the asynchronous clock generator, and outputting the measured value which is the number of clock pulses of the asynchronous clock;
a phase controller for receiving the digital signal from the A/D converter and calculating a phase error between the digital signal and the asynchronous clock generated by the asynchronous clock generator; and
a pseudo-synchronous clock generator for thinning the asynchronous clock of the asynchronous clock generator based on the specific pattern appearance interval measured by the asynchronous timing detector and the phase error calculated by the phase controller to generate a pseudo-synchronous clock which is pseudo-synchronous with the data recording timing.

2. The timing extraction device of claim 1, wherein
the asynchronous timing detector calculates a cycle ratio of the asynchronous clock to the synchronous clock based on the number of clock pulses of the asynchronous clock corresponding to the measured specific pattern appearance interval and a set number of clock pulses of a synchronous clock synchronous with data recording timing within the specific pattern appearance time interval, and
the pseudo-synchronous clock generator thins the asynchronous clock of the asynchronous clock generator based on the cycle ratio from the asynchronous timing detector and the phase error calculated by the phase controller.

3. The timing extraction device of claim 1, wherein
the asynchronous timing detector receives the digital signal and determines that a specific pattern has been detected if a ratio of the number of successive data "1"s to the number of successive data "0"s included in the digital signal is within a predetermined range.

4. The timing extraction device of claim 3, wherein
the asynchronous timing detector determines that a specific pattern has been detected only if a ratio of the number of successive data "1"s to the number of successive data "0"s is within a predetermined range and a total of the number of the successive "1"s and the number of the successive "0"s is within a predetermined range.

5. The timing extraction device of claim 1, comprising:
a synchronous timing detector for receiving the pseudo-synchronous clock generated by the pseudo-synchronous clock generator, and based on the pseudo-synchronous clock, measuring an appearance interval of a specific pattern included in the digital signal from the A/D converter, and confirming whether or not the number of clock pulses of the pseudo-synchronous clock corresponding to the measured specific pattern appearance interval is equal to a set number of clock pulses of a synchronous clock synchronous with data recording timing within the specific pattern appearance time interval.

6. The timing extraction device of claim 1, wherein
the asynchronous clock generator generates an asynchronous clock having a fixed frequency.

7. The timing extraction device of claim 3, wherein
a ratio of the number of successive data "1"s and the number of successive data "0"s included in the digital signal is 14:4 in DVD-ROMs, 11:11 in CDs, and 2:9:9 in Blu-rays.

8. The timing extraction device of claim 3, wherein
the predetermined range is a range of a ratio in which there is a margin of ±1 with respect to each of the number of successive data "1"s and the number of successive data "0"s.

9. The timing extraction device of claim 1, wherein
the set number of clock pulses of the synchronous clock within the specific pattern appearance time interval is 1488 in DVDs, 588 in CDs, and 1932 in Blu-rays.

10. The timing extraction device of claim 1, wherein
the phase controller includes a loop filter for smoothing a calculated phase error value.

11. The timing extraction device of claim 10, wherein
the loop filter includes an IIR digital filter.

12. The timing extraction device of claim 10, wherein
the loop filter includes an FIR digital filter.

13. The timing extraction device of claim 10, wherein
the loop filter calculates an average value of calculated phase errors in predetermined time intervals.

14. The timing extraction device of claim 10, wherein
the loop filter subjects a calculated phase error to gain multiplication with a specific value.

15. The timing extraction device of claim 1, wherein
a baseline controller for removing a DC offset included in the digital signal from the A/D converter is provided between the A/D converter and the asynchronous timing detector.

16. The timing extraction device of claim 1, wherein
a digital equalizer for amplifying a signal having a specific band of the digital signal from the A/D converter is provided between the A/D converter and the asynchronous timing detector.

17. The timing extraction device of claim 1, wherein
the asynchronous timing detector has a zero crossing detector operated based on the asynchronous clock of the asynchronous clock generator and for determining the polarities of two adjacent pieces of data in the digital signal from the A/D converter.

18. The timing extraction device of claim 1, wherein
the asynchronous timing detector has an adder for receiving the asynchronous clock of the asynchronous clock generator, and based on the asynchronous clock, adding the number of clock pulses of the asynchronous clock.

19. The timing extraction device of claim 1, wherein
the phase controller has an adder and a multiplier for receiving the digital signal from the A/D converter, and based on the asynchronous clock of the asynchronous clock generator, calculating a phase error in the digital signal from the A/D converter.

20. A video display device comprising:
an LSI having the timing extraction device of claim 1 and a signal processing circuit for receiving the pseudo-synchronous clock obtained by the timing extraction device, and based on the pseudo-synchronous clock, decoding a received signal including audio data and video data; and
a display terminal for receiving a decoded signal from the LSI and displaying decoded video data while emitting decoded audio data.

21. The timing extraction device of claim 1, wherein
the received signal is supplied via a wireless communication channel or a communication channel including an optical fiber, a coaxial cable, or a power line.

22. The timing extraction device of claim 1, wherein
the received signal is supplied from an optical disc including a DVD disc, a CD disc, or a Blu-ray disc.

* * * * *